(12) United States Patent
Zocholl et al.

(10) Patent No.: US 7,675,720 B1
(45) Date of Patent: Mar. 9, 2010

(54) MOTOR PROTECTION USING ACCURATE SLIP CALCULATIONS

(75) Inventors: Stanley E. Zocholl, Holland, PA (US); Subhash C. Patel, West Chester, PA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 12/208,272

(22) Filed: Sep. 10, 2008

(51) Int. Cl.
  *H02H 7/08* (2006.01)
(52) U.S. Cl. ............... 361/25; 361/23; 361/31; 361/33; 318/445; 318/461; 318/455; 322/34
(58) Field of Classification Search ............ 361/25, 361/24, 31, 33; 318/445, 461, 455, 471, 318/472, 473, 474, 479; 322/34
  See application file for complete search history.

(56) References Cited

U.S. PATENT DOCUMENTS

| | | | |
|---|---|---|---|
| 4,547,826 A | 10/1985 | Premerlani | |
| 4,743,818 A | 5/1988 | Quayle | |
| 4,914,386 A | 4/1990 | Zocholl | |
| 5,086,264 A | 2/1992 | Kelledes | |
| 5,436,784 A * | 7/1995 | Schweitzer et al. | 361/25 |
| 5,539,601 A * | 7/1996 | Farag | 361/23 |
| 5,793,595 A | 8/1998 | Schweitzer, III | |
| 6,042,265 A * | 3/2000 | Kliman et al. | 374/152 |
| 6,356,421 B1 | 3/2002 | Guzman-Casillas | |
| 6,757,146 B2 | 6/2004 | Benmouyal | |
| 7,123,457 B2 | 10/2006 | Schweitzer, III | |
| 7,161,778 B2 | 1/2007 | Zocholl | |

OTHER PUBLICATIONS

Stanley E. Zocholl, Schweitzer Engineering Laboratories, Inc.- Tutorial: From the Steinmetz Model to the Protection of High Inertia Drives- Oct. 2006.
E.O. Schweitzer, III, S.E. Zocholl, Aspects of Overcurrent Protection for Feeders and Motors - May 1994.
Stanley E., Zochol, Comparing Motor Thermal Models, 2003.
Patrick Whatley, Mark Lanier, Lee Underwood, Stan Zocholl, Enhanced Motor Protection with the Slip-Dependent Thermal Model: a Case Study, Sep. 12, 2007.
S.E. Zocholl, Induction Motors: Part I - Analysis, 1996.
S.E. Zocholl, Induction Motors: Part ll - Protection, 1996.
Stanley E. Zocholl, Optimizing Motor Thermal Models, Apr. 24, 2006.
Stanley E. Zocholl, Armando Guzman, Thermal Models in Power System Protection, 1999.
S.E. Zocholl, Understanding Service Factor, Thermal Models, and Overloads, Oct. 2005.
Stanley E. Zocholl, Gabriel Benmouyal, Using Thermal Limit Curves to Define Thermal Models of Induction Motors, Oct. 2001.
Ed Lebenhaft, Field Evaluation of Slip-Dependent Thermal Model for Motors with High-Inertia Starting, Sep. 17, 2007.

* cited by examiner

*Primary Examiner*—Rita Leykin
(74) *Attorney, Agent, or Firm*—Richard M. Edge

(57) ABSTRACT

An accurate slip calculation for providing monitoring and protection to an electric motor. The slip calculation is made using a minimum value of stator resistance as the initial stator resistance, where the minimum value of stator resistance is the minimum value of stator resistance calculated during an initiation period of the motor. The initiation period may be a predetermined time period or a predetermined number of cycles during the motor startup. The initiation period may start after a predetermined settling time or after a predetermined condition is met.

36 Claims, 6 Drawing Sheets

MOTOR PROTECTION USING ACCURATE SLIP CALCULATIONS

RELATED APPLICATION

None.

TECHNICAL FIELD

This disclosure relates to thermal monitoring and protection of electric motors. More particularly, this disclosure relates to monitoring and protecting an electric motor using a resistance calculated from an accurate determination of slip.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1A:
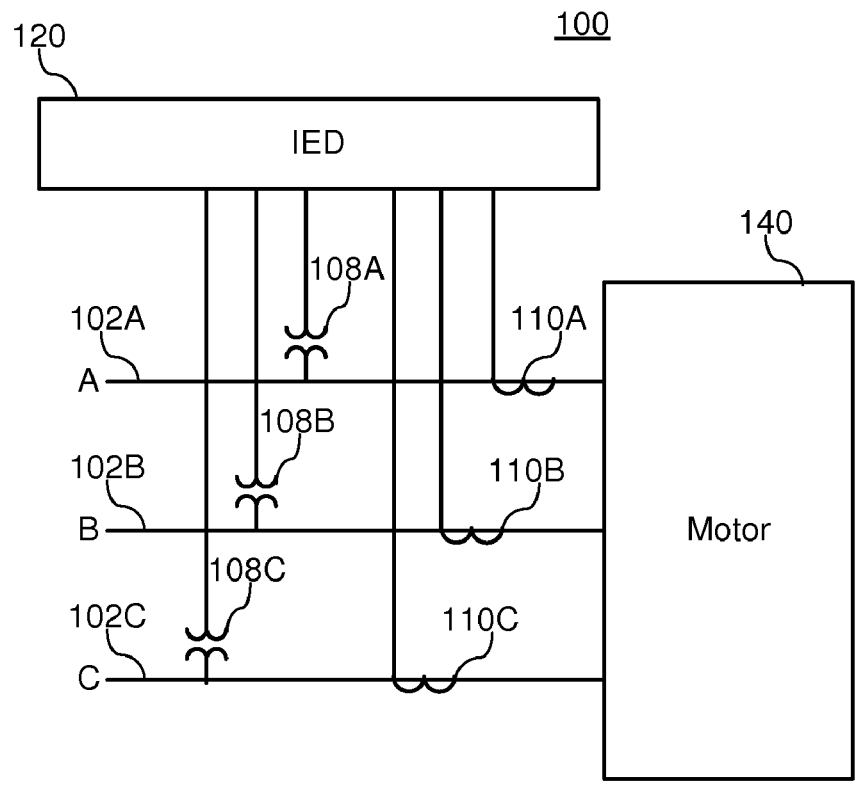
FIG. 1a is a block diagram of a three-phase motor and an intelligent electronic device (IED)

Three-phase motors are widely used throughout industry to transform electrical energy to mechanical energy which may be used to perform work. Motors are often necessary pieces of equipment for performing numerous industrial tasks from pumping water to processing materials. Because motors are such an integral part of many industries, loss of use of a motor can cause great delays and loss of income while the motor is off line. Therefore, motors are monitored and protected against overheating, which is one incident that can shorten a motor's productive lifetime, requiring replacement of or maintenance to the motor. Further, the monitoring and protection of motors is carefully controlled such that a motor is not taken off line unless it is indeed experiencing a condition that would warrant such action. For example, motor protection schemes meant to interrupt a motor startup due to overheating attempt to determine as accurately as possible the temperature conditions of the rotor. If the schemes are overly conservative, the motor startup would be prematurely stopped, resulting in unnecessary and disruptive downtime. However, if the schemes underestimate the actual temperature conditions, the motor may experience unnecessary and premature harm due to the elevated temperature conditions.

Intelligent electronic devices (IEDs) are often used to monitor various aspects of electric motors and provide protection thereto. Using certain values provided by the motor manufacturer as well as the currents and voltages supplied to the motor, IEDs can be programmed to determine various conditions of the motor and provide protection to the motor by taking the motor off line when certain conditions are determined to be present in the system. For example, the IED may be programmed to determine the temperature of the rotor and take the motor off line if the temperature exceeds a certain value.

Protection against overheating of the rotor is especially important during the startup of the motor. Certain physical conditions during startup result in the rotor temperature increasing rapidly. Motors typically include a rotor with windings through which an alternating current flows, causing a magnetic field in the rotor windings. The rotor winding may consist of bars parallel to the motor shaft. End rings connect the bars to form a short-circuited assembly. Similarly, the motor typically includes a stator with similar windings and resulting magnetic fields. The magnetic fields cause the rotor to spin. During startup, the magnitude of the current through the windings is much higher than it is at the rated speed of the motor. This increased current causes the temperature in the windings to increase dramatically. When the rotor finally reaches its rated speed, the current flowing through the windings decreases considerably and the temperature slowly decreases as well.

Further, when the rotor is not moving (known as "locked rotor" condition), the frequency of the current, voltage, and magnetic flux in the windings of the rotor is the rated frequency of the power system supplying electric power to the motor (typically near 60 Hz in the US, 50 Hz in Europe). This high frequency results in the majority of the current flowing through the "skin" of the rotor (known as the "deep bar effect"). Because the cross-sectional area of the conductor through which the current flows is effectively decreased, the resistance is increased, resulting in a temperature increase that is more rapid than if the current were flowing through the entire cross-sectional area of the conductor. As the rotor reaches its rated speed the frequency of the current, voltage, and magnetic flux in the windings thereof decreases to the slip at rated speed (relatively low). As the frequency in the rotor decreases, so does the deep bar effect and the resistance of the rotor. Thus, the rate at which heat is produced by the rotor decreases as the rotor approaches its rated speed.

Accordingly, for proper protection of the motor, it is critical to monitor the rotor temperature during startup, when the temperature is increasing at its highest rate. Accurate calculations of rotor temperature during startup are helpful in providing proper protection during startup.

FIG. 1a illustrates a block diagram of a system 100 including a three-phase motor 140 and a protective IED 120. The motor includes inputs from each phase of electric power 102A, 102B, and 102C. The inputs each include a current transformer 110A, 110B, 110C for providing inputs to the IED representing the currents from each phase to the motor 140. The inputs each also include a potential transformer 108A, 108B, and 108C for proving inputs to the IED representing the voltages of each phase to the motor 140. With the current and voltage signals from each phase, the IED 120 can monitor various conditions of the motor 140 including the rotor temperature.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, and the like, that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Figure 1B:
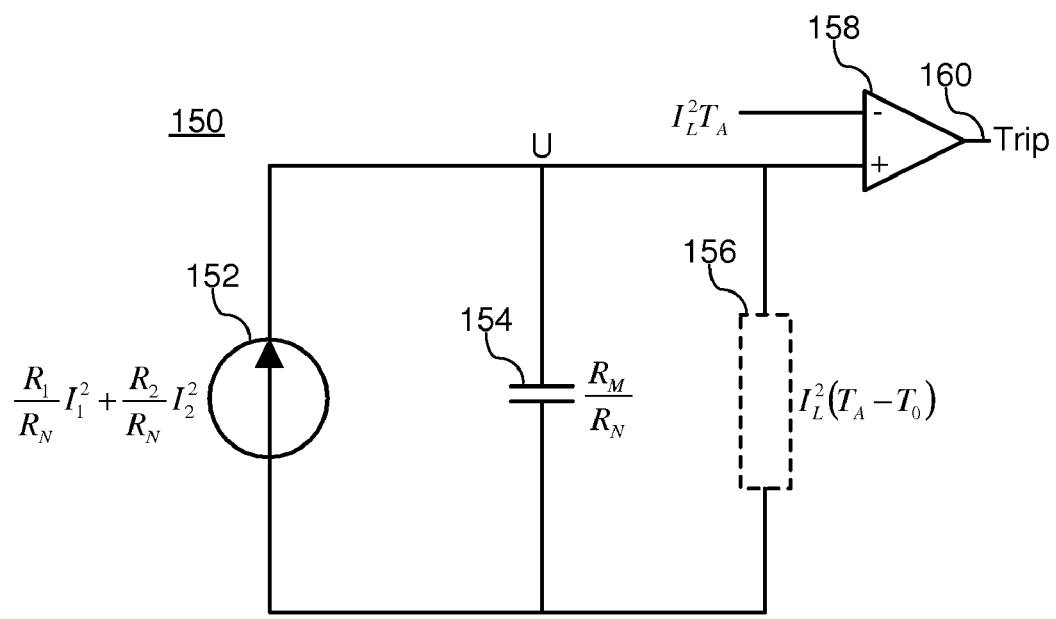
FIG. 1b is a circuit diagram of a rotor thermal model for an electric motor.

FIG. 1b illustrates a first-order thermal model 150 of the rotor temperature of the motor. The model 150 illustrates the heating effect caused by the power supplied to the motor 152. The heating effect is a sum of the positive-sequence current ($I_1$) and the negative-sequence current ($I_2$) multiplied by their respective resistances, thus, $$\frac{R_1}{R_N} I_1^2 + \frac{R_2}{R_N} I_2^2$$

where $R_N$ is the rotor resistance at rated speed (see Equation 1), $R_2$ is the negative-sequence rotor resistance and $R_1$ is the positive-sequence rotor resistance (see Equations 2 and 3).

The rotor resistance at rated speed $R_N$ can be calculated using:

$$R_N = 1 - \frac{FL\omega}{Syn\omega} \qquad \text{Eq. 1}$$

where $FL\omega$ is the full load speed and $Syn\omega$ is the synchronous speed.

The positive-sequence rotor resistance $R_1$ and the negative-sequence rotor resistance $R_2$ can be calculated using Equations 2 and 3, respectively:

$$R_1 = (R_M - R_N)S + R_N \qquad \text{Eq. 2}$$

$$R_2 = (R_M - R_N)(2-S) + R_N \qquad \text{Eq. 3}$$

where $R_M$ is the locked rotor resistance (see Equation 4), and S is motor slip.

The locked rotor resistance $R_M$ can be calculated using:

$$R_M = \frac{LRQ}{I_L^2} \qquad \text{Eq. 4}$$

where LRQ is the locked rotor torque in per unit of rated torque and $I_L$ is the locked rotor current in per unit full load current.

Turning again to FIG. 1b, the capacitive element 154 represents the thermal mass of the rotor and is calculated using $$\frac{R_M}{R_N},$$

with $R_M$ and $R_N$ being described above.

The resistive element 156 represents the cooling effect present in the motor, and can be calculated using $$I_L^2(T_A - T_0)$$

where $T_A$ is the locked rotor thermal limit time, starting with the motor at ambient temperature, and $T_0$ is the locked rotor thermal limit time starting when the motor is at a run temperature.

During startup, the model can be assumed to be adiabatic, modeled by eliminating the resistive element 156. This results in the temperature U being calculated by the combination of elements 152 and 154.

The combined effect of elements 152, 154, and 156 is compared in comparator 158 against the threshold of $I_L^2 T_A$. If it is greater than the threshold, then the model produces an output 160 resulting in a trip signal, ultimately causing the motor to trip off.

As can be seen above, determining whether to trip a motor during startup depends on a comparison of the calculated thermal effect U of the motor against a threshold value. The thermal effect U on the motor is a function of motor resistance, which is, in turn, a function of slip.

Rotor resistance $R_r$ is calculated using:

$$R_r = (R_M - R_N)S + R_N \qquad \text{Eq. 5}$$

where it is plainly seen that rotor resistance $R_r$ is a function of slip S, locked rotor resistance, ($R_M$, a constant), and rotor resistance at rated speed, ($R_N$, also a constant). Because the thermal effect on the rotor is a function of the rotor resistance, a more accurate calculation of slip will yield a more accurate calculation of rotor resistance, in turn leading to accurate temperature calculations and better motor protection and monitoring.

Slip S can be calculated using:

$$S = \frac{R_N}{A(R - R_{SI}) - (R_M - R_N)} \quad \text{Eq. 6}$$

where A is a constant, R is motor resistance (see Equation 7), $R_{S\_I}$ is initial stator resistance (see Equation 8), and $R_M$ and $R_N$ are described above.

Motor resistance R can be calculated using:

$$R = \text{real}\left(\frac{V_1}{I_1}\right) \quad \text{Eq. 7}$$

where $V_1$ is the positive-sequence voltage calculated from the voltage signals from the three phases, and $I_1$ is the positive-sequence current calculated from the current signals from the three phases.

Initial stator resistance $R_{S\_I}$ can be calculated using either:

$$R_{S\_I} = R_P - \frac{R_M}{A} \quad \text{Eq. 8}$$

where $R_P$ is the initial motor resistance.

The initial motor resistance $R_P$ can be calculated using:

$$R_P = \text{real}\left(\frac{V_{1(cyc)}}{I_{1(cyc)}}\right) \quad \text{Eq. 9}$$

where $V_{1(cyc)}$ is a positive-sequence voltage at a selected initial cycle during startup and $I_{1(cyc)}$ is a positive-sequence current at a selected initial cycle during startup. As discussed in more detail herein, initial motor resistance $R_P$ may be calculated by determining the minimum of the motor resistance R:

$$R_P = \text{minimum}[R] \quad \text{Eq. 10}$$

Figure 2:
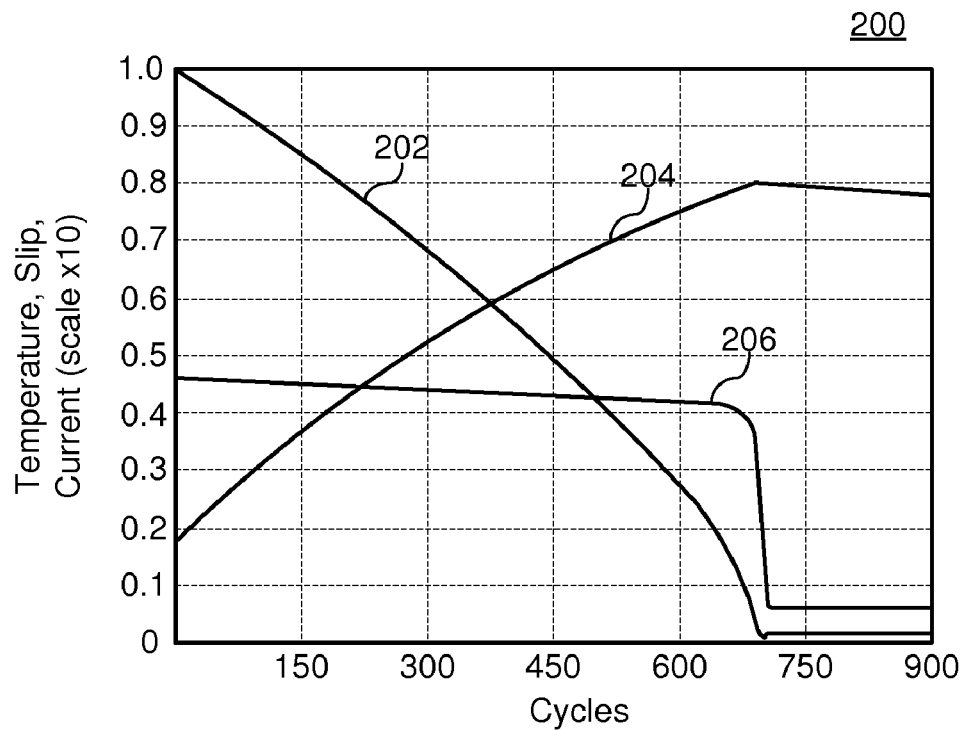
FIG. 2 is a diagram showing rotor temperature, current, and slip during motor startup.

FIG. 2 is a diagram 200 showing traces during a typical startup of an electric motor. As can be seen, the current into the motor 206 remains at a relatively high level until the rotor reaches its rated speed, seen at between about 650 and 700 power system cycles. The current then drops to a relatively constant value. The rotor temperature 204 is plotted on a per-unit basis. As can be seen, the temperature 204 increases quickly during startup until the rotor approaches and reaches its rated speed between about 650 and 700 power system cycles. The temperature 204 reaches a maximum value of around 80% of its maximum allowable temperature. Once the rated speed is reached, the current decreases, and the rotor temperature slowly decreases as well. The slip 202 is also plotted on a per-unit basis. As can be seen, slip starts at a value of 1 at startup, and decreases until the rotor reaches its rated speed at between about 650 and 700 power system cycles, after which it remains at a relatively constant and low value.

Figure 3:
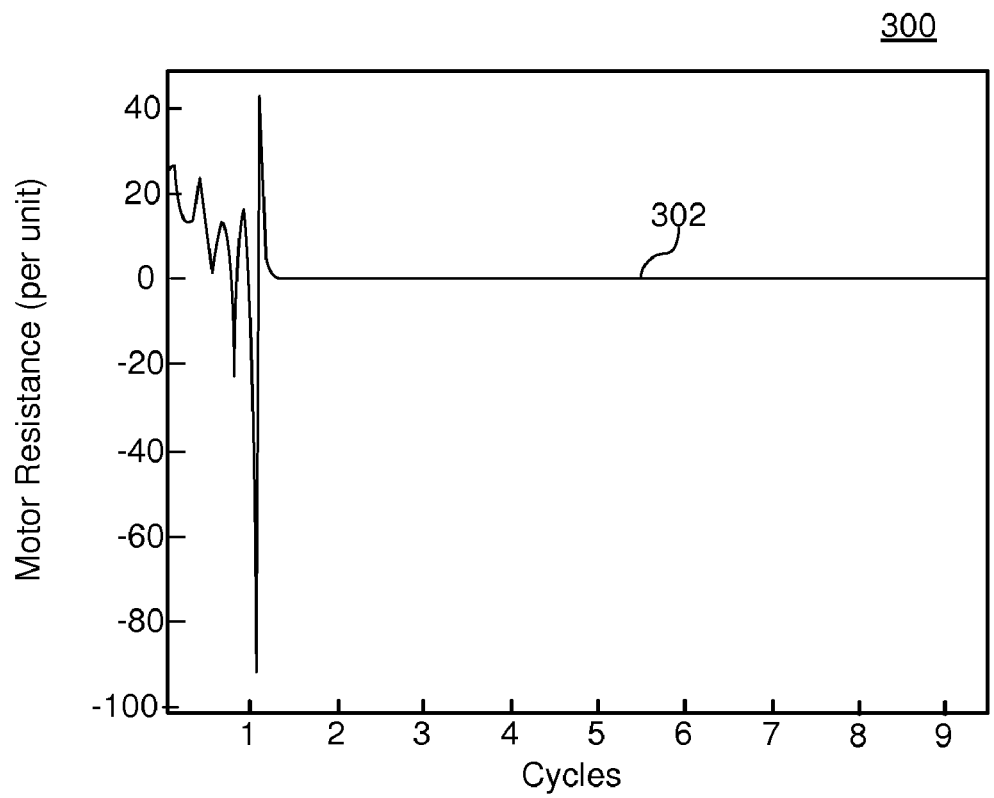
FIG. 3 is a diagram showing per unit motor resistance during motor startup.

FIG. 3 is a diagram 300 illustrating the value of motor resistance R 302 calculated using Equation 7 through the first 10 cycles during startup. As can be seen, the value of motor resistance R 302 settles to a constant value shortly after the first power system cycle. Because of this rapid settling, the selected cycle for determining the a positive-sequence voltage $V_{1(cyc)}$ and is a positive-sequence current $I_{1(cyc)}$ is not important, so long as it is after settling (just over one cycle in this example). The selected cycle for these calculations in FIG. 2 is the eighth power system cycle.

Figure 4:
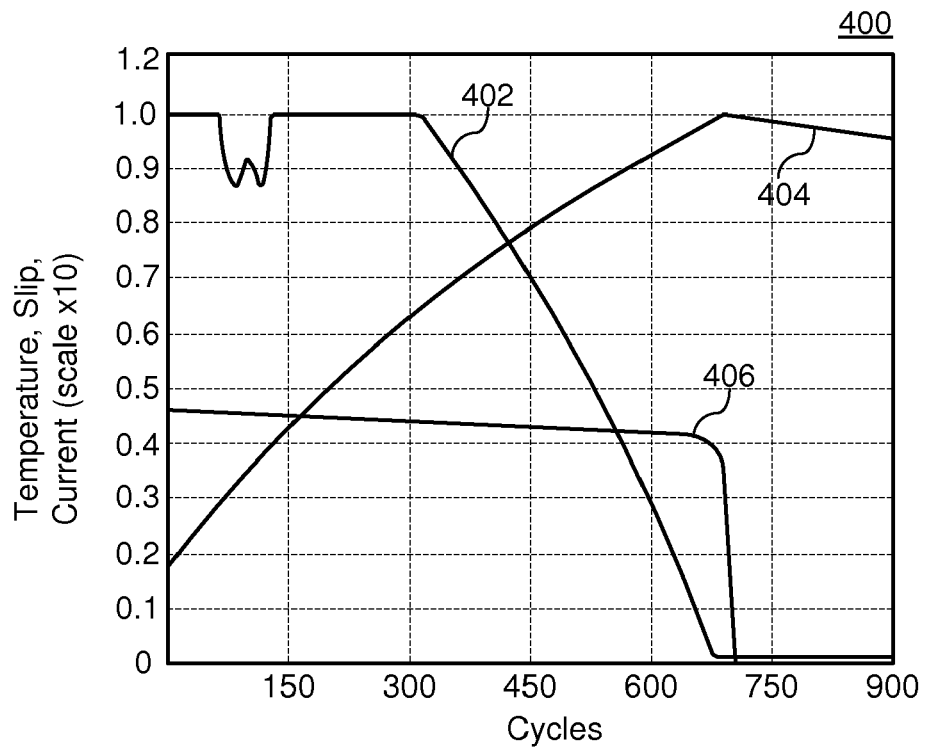
FIG. 4 is a diagram showing rotor temperature, current, and slip during motor startup.

By comparison, FIG. 4 shows a diagram 400 of the same calculations as in FIG. 2 during a different startup. As can be seen, the current 406 values follow much the same trend as in FIG. 2. The calculated slip values 402, however, remain at a value of one (except for one minor excursion between about 75 and 125 power system cycles) for an extended period of time—until just after 300 power system cycles. Slip values 402 then decrease to a relatively low value once the rotor reaches its rated speed. Because the slip values remain high, the calculated rotor temperature values 404 also remain high, reaching a value of 100% before falling.

Figure 5:
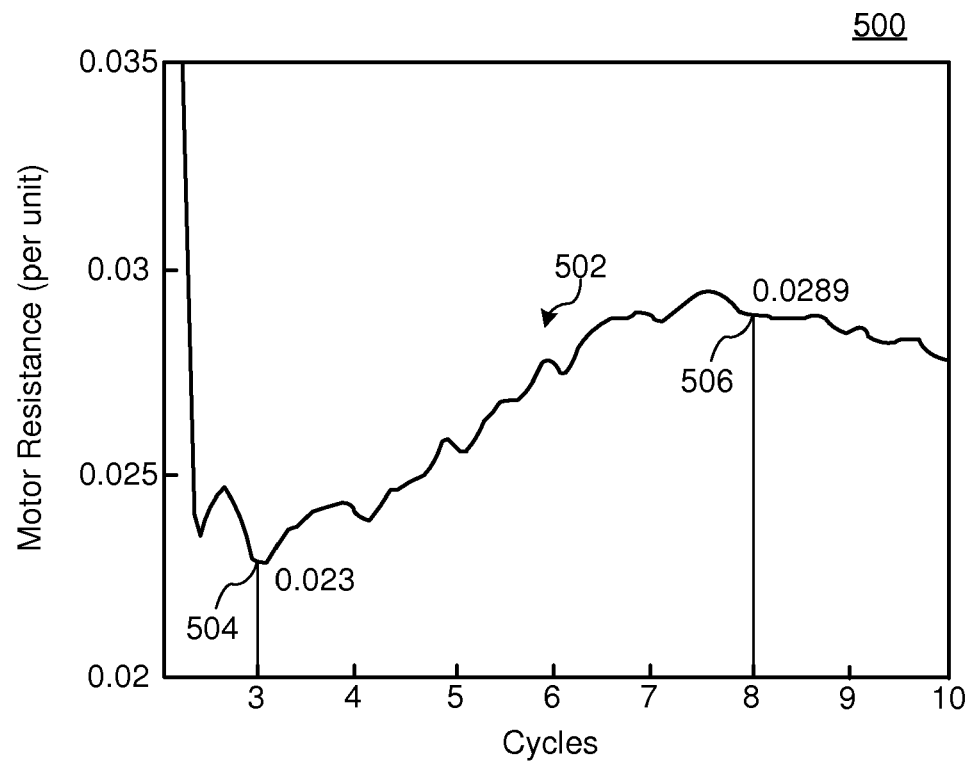
FIG. 5 is a diagram showing per unit motor resistance during motor startup.

The IED performing the calculations whose results are illustrated in FIG. 4 was programmed to reflect a slip value of one if the slip calculation yielded a slip value greater than one. As can be seen above, the slip and temperature values are dependant on the initial stator resistance value (and/or the initial rotor resistance value), which in turn depends on the positive-sequence voltage and current values at a particular cycle. FIG. 5 is a plot 500 of the motor resistance values 502 calculated during the first 10 cycles of the same motor startup as in FIG. 4. Instead of settling to a constant value shortly after the first power system cycle as illustrated in FIG. 3, the motor resistance illustrated in FIG. 5 varies. The value of initial motor resistance $R_P$ was calculated using values at the eighth power system cycle 506, yielding a motor resistance, $R_P$ value of 0.0289.

Figure 6:
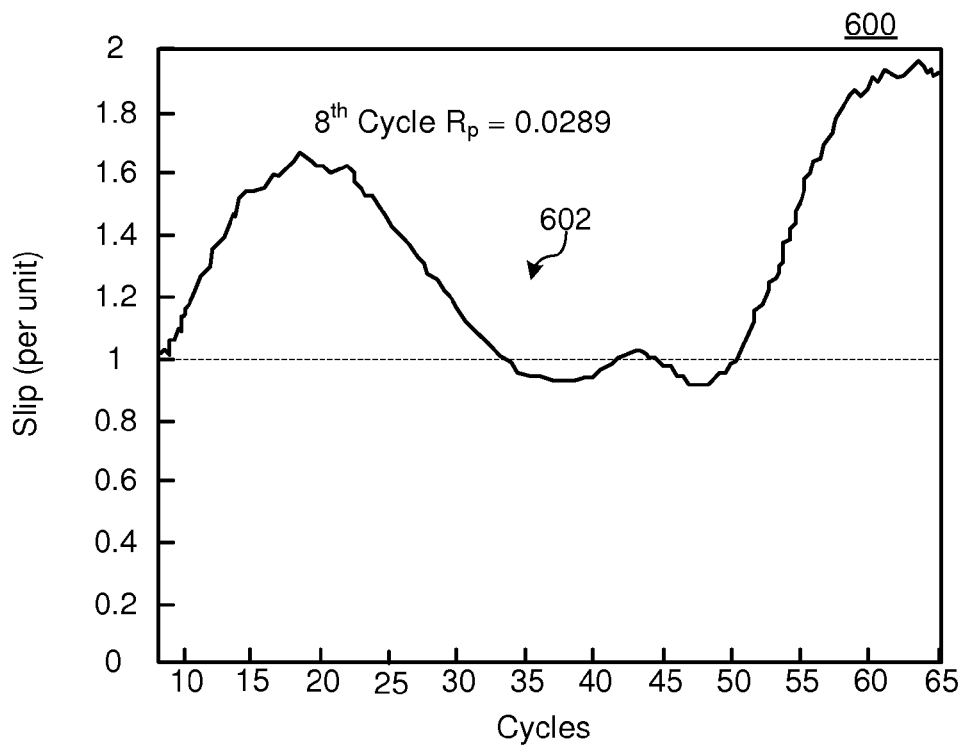
FIG. 6 is a diagram showing per unit slip during motor startup.

As can be seen in the plot 600 of FIG. 6, when the value of stator resistance, $R_S$, calculated using the motor resistance at the eighth power system cycle, the calculated slip yielded values 602 that exceeded one. Thus the IED reported values of one for an extended period of time as previously mentioned and as illustrated in FIG. 4.

Figure 7:
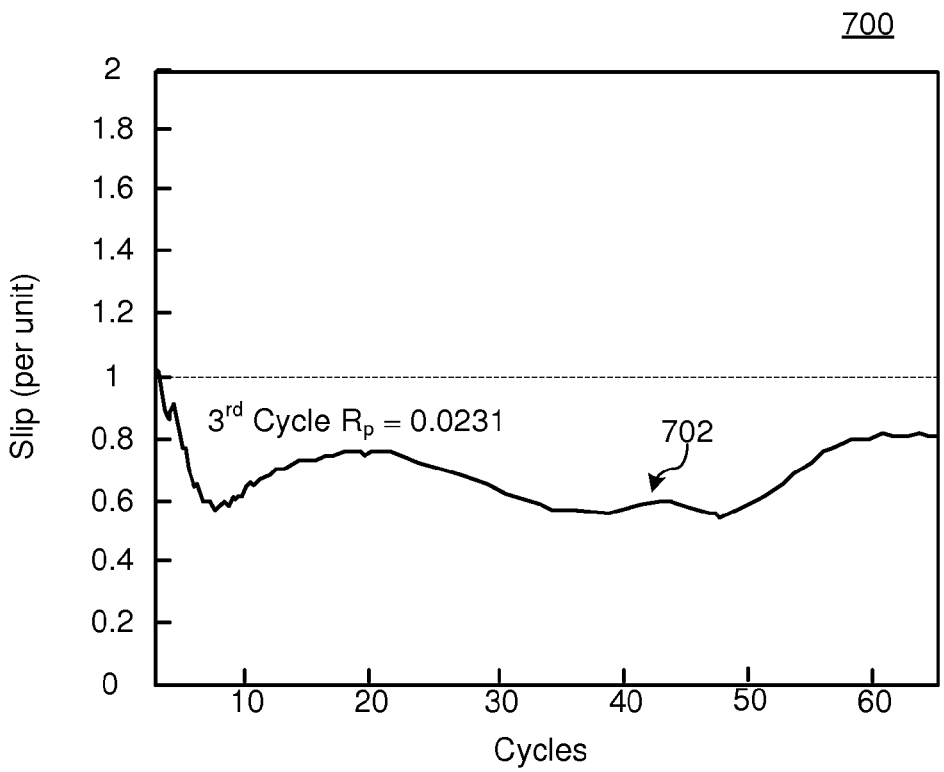
FIG. 7 is a diagram showing per unit slip during motor startup.

The present disclosure describes a method of more accurately calculating slip using the minimum value of initial motor resistance $R_p$ calculated during an initiation period during startup instead of a value calculated at a particular power system cycle. Turning again to FIG. 5, illustrated is the minimum value of motor resistance R 504 at the third power system cycle of 0.023. Using this value for the initial motor resistance $R_P$ yields the values for slip 702 plotted in FIG. 7, which illustrates a plot 700 of slip values. As can be seen, in FIG. 7 values for slip 702 remain below one.

Accordingly, the present disclosure includes accurate calculations of slip using a minimum value of motor resistance R calculated during an initiation period during startup, and using that value as the initial motor resistance $R_P$ to determine slip and ultimately to provide thermal monitoring and protection during startup of the motor.

It should be noted that the stator resistance $R_S$ is a function of the initial motor resistance $R_P$ and constants. Thus, the present disclosure also includes accurate calculations of slip using the initial stator resistance $R_{S\_I}$ as described above. For simplicity, this disclosure may include descriptions using the initial motor resistance. Further, for simplicity, this disclosure may refer to "initial resistance", which includes either the initial motor resistance or the initial stator resistance.

The initiation period during startup may include any predetermined period during startup. For example, the initiation period may be defined by a particular number of power system cycles during startup, or a particular period of time during startup. Further, the initiation period may begin after some predetermined time during startup, or after some predetermined condition occurs. This may be beneficial if the calculated motor resistance R oscillates before settling, as can be seen in FIG. 3. For example, the IED may include an overcurrent element that does not start the initiation period counter until after the current exceeds a certain value, or settles to a particular value. Typically such settling requires only a few power system cycles.

The initiation period may be during the first 10 power system cycles during startup. The initiation period may be during the first 8 power system cycles during startup. The initiation period may be during the first 6 power system cycles during startup. The initiation period may be during the first 4 power system cycles during startup. The initiation period may be from about the beginning of the second power system cycle through the tenth power system cycle during startup. The initiation period may be from about the end of the second power system cycle through the fourth power system cycle. The cycle counting may begin after the first power system cycle after closing in the breakers to the motor. The cycle counting may begin after a predetermined condition is met such as a current condition detected by an overcurrent element (for example, a current of 2.5 per unit), a settling condition, or the like.

Figure 8:
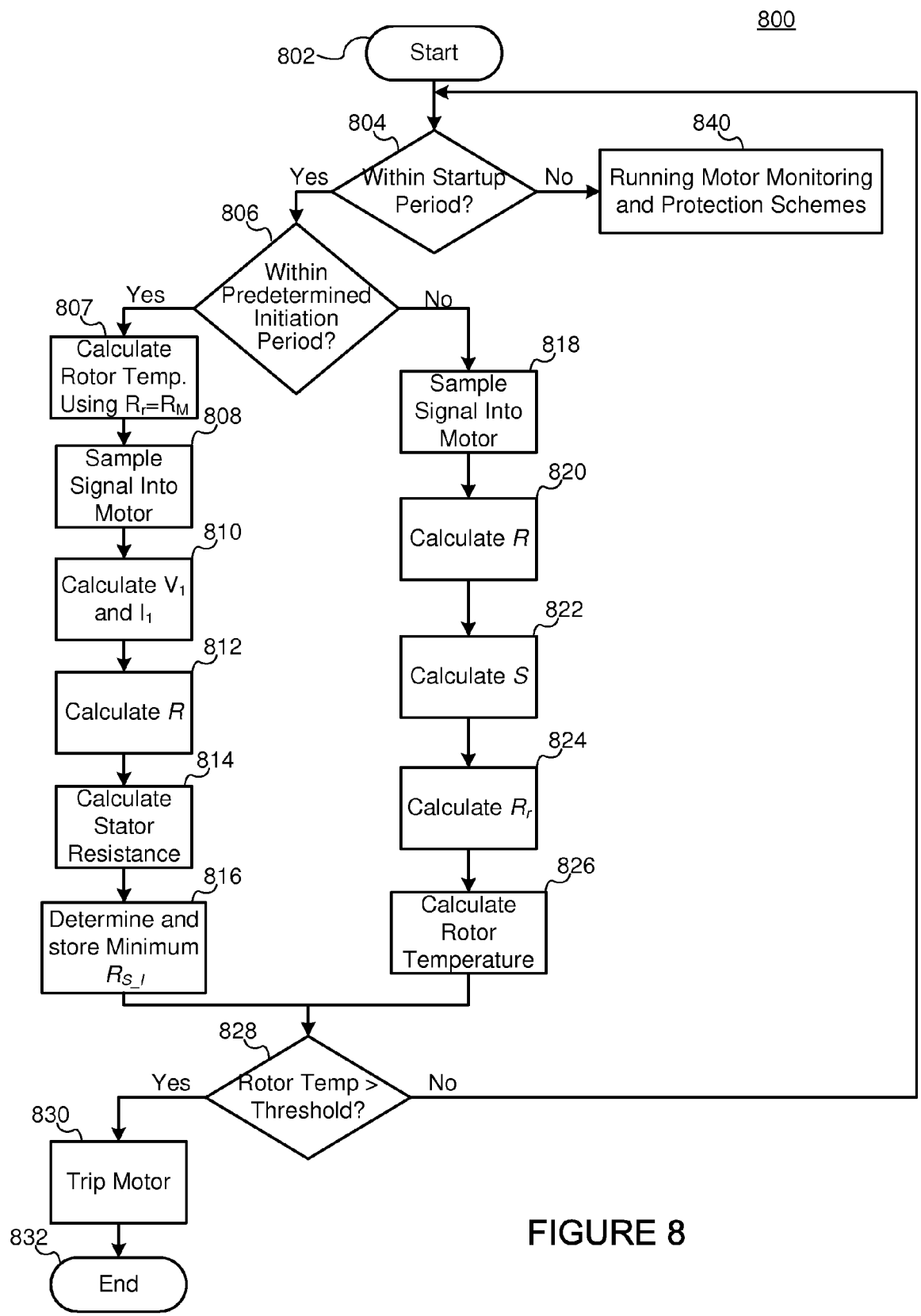
FIG. 8 is a flowchart illustrating a method of monitoring and protecting an electric motor.

A method 800 for providing thermal monitoring and protection to an electric motor is further described as illustrated in FIG. 8. The method 800 starts 802 with determining whether the motor is within its startup period 804. If not, the method proceeds to using running motor monitoring and protection schemes 840 (assuming that the motor is running). If the motor is within its startup period, then the method determines whether the motor is within its initiation period as discussed above 806. If the motor is within the initiation period, the method starts by calculating the rotor temperature 807 using rotor resistance $R_r$ equal to $R_M$. The method continues to the steps where the initial resistance value is determined starting with the steps of sampling the electrical signals into the motor 808. Positive-sequence voltage $V_1$ and current $I_1$ values are then calculated 810. From those values, the motor resistance R is then determined 812. The values of the motor resistance R are then used to calculate values of stator resistance $R_S$ 814. The method then determines if the calculated value of stator resistance is the minimum value, and stores it as the initial stator resistance value $R_{S\_I}$ if it is the minimum 816. The rotor temperature is then compared against a predetermined threshold 828. If the rotor temperature exceeds the predetermined threshold, then the method trips the motor 830 and ends 832. Otherwise, the method returns to the step of determining whether the motor is within the startup period 804.

Turning back to the step of determining whether the motor is within the initiation period 806, if the motor is not within the initiation period, the method continues to sample the electrical signals into the motor 818. The method then calculates the motor resistance R as described above 820. The method proceeds to calculate slip, S, 822 using the values of motor resistance R initial stator resistance $R_{S\_I}$ locked rotor resistance $R_M$ rotor resistance at rated speed $R_N$ and constant A. The method then calculates the rotor resistance $R_r$ 824 using the rotor resistance $R_M$ rotor resistance at rated speed $R_N$ and slip S values. The method then calculates the rotor temperature 826 and compares the rotor temperature against a predetermined threshold 828. If the rotor temperature exceeds the predetermined value, then the method trips the motor 830 and ends 832. Otherwise, the method returns to step 804 to continue monitoring and protecting the motor during startup.

Figure 9:
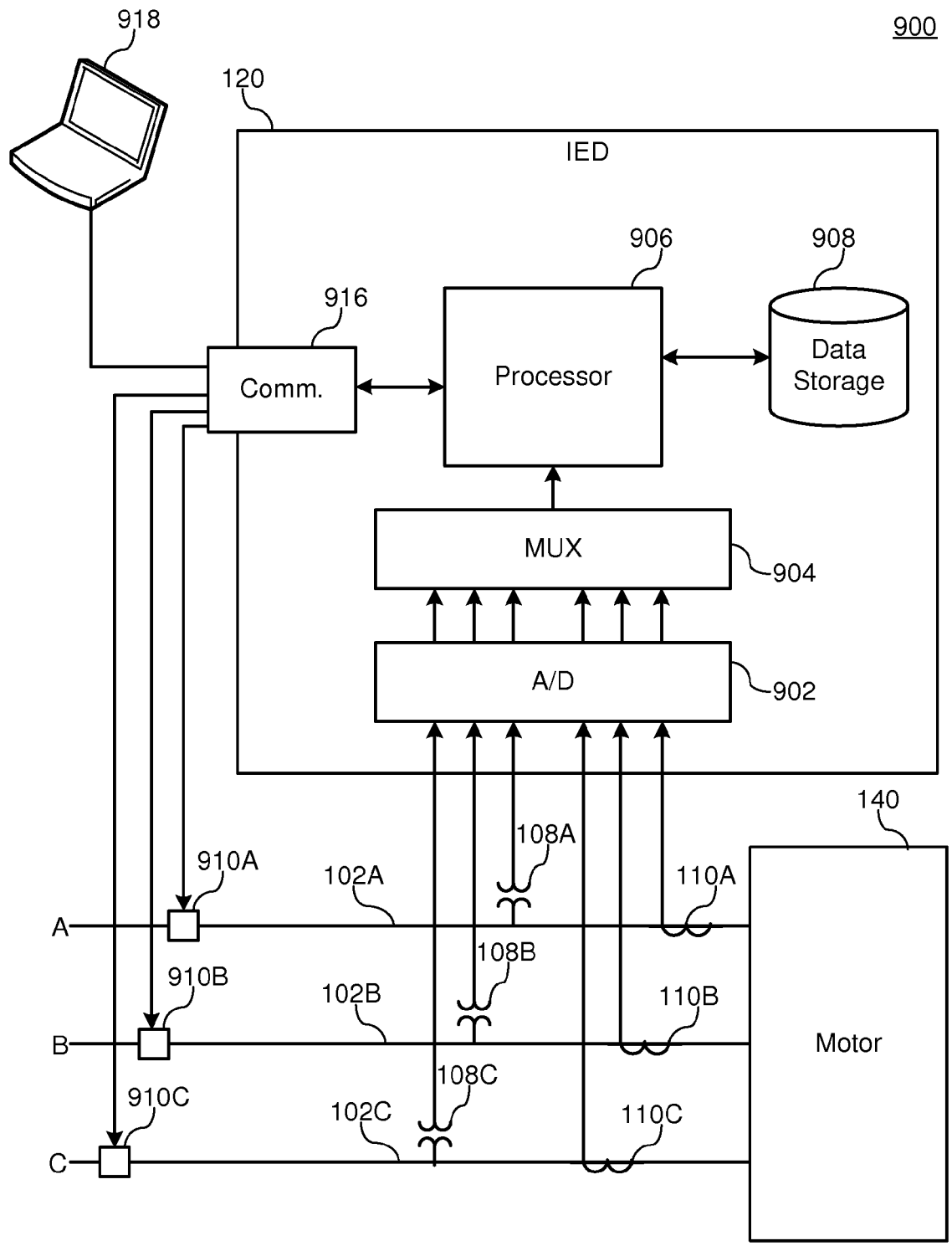
FIG. 9 is a block diagram illustrating an apparatus and system for providing protection to an electric motor.

An apparatus and system for monitoring and protecting electric motors using an accurate slip calculation are also disclosed in the present specification. FIG. 9 illustrates one particular example of an apparatus and system 900 according to the present disclosure. As with FIG. 1, a three-phase electric motor 140 is protected by an IED 120 which receives power system signals in the form of signals representative of the currents and voltages from all three phases to the motor. The IED may include an intelligent electronics device capable of monitoring and protecting the motor using the methods described herein. Some examples of IEDs that may be used includes protective relays, motor protective relays, and the like. These signals may be provided to a processor 906 via various filters (such as low-pass filters, not separately illustrated), an analog-to-digital converter (A/D) 902, and a multiplexor 904. Various other pre-processing devices and steps may be incorporated as needed. These various pre-processing devices and steps may be performed on a processor or the like. Further, the pre-processing devices and steps may include a sampler (the A/D may function as a sampler) for sampling the signals. The signals representing the currents and voltages from the three phases are ultimately provided to a processor (such as a microprocessor, microcontroller, application specific integrated circuit (ASIC), field programmable gate array (FPGA), and the like), where the methods described herein are performed. The IED may include data storage 908 where the particular modules, calculators, and/or computer instructions for operating the present methods may be stored. Further, values calculated by the processor 906 may be stored using the data storage 908 as is needed. The IED thus contains various calculators and/or modules for making the various calculations described herein, though the various calculators are not separately illustrated.

The various modules, calculators and/or computer instructions may include a positive-sequence current calculator for calculating positive-sequence current values from the current samples. A positive-sequence voltage calculator may also be included for calculating positive-sequence voltage values from the voltage samples. A resistance calculator may be included for calculating a resistance from the positive-sequence current values and the positive-sequence voltage values as described above. An initial resistance calculator may be included for determining an initial resistance value that is equal to a minimum of the resistance values calculated by the resistance calculator during the predetermined initiation period. The initial resistance calculator may be an initial rotor resistance calculator or an initial stator resistance calculator, as described above. A slip calculator may be included for determining slip values using the initial resistance value and the resistance values, as described above. A rotor resistance calculator may be included for calculating a slip-dependent rotor resistance from the slip values using the methods described herein. The rotor resistance calculator may further calculate positive-sequence rotor resistance values from the slip values and calculate negative-sequence rotor resistance values, as described above. Further, a rotor temperature calculator may be included for calculating a rotor temperature from the current values and the slip-dependent rotor resistance values, using the methods described herein. The rotor temperature calculator may be configured to calculate rotor temperature values from the calculated positive-sequence rotor resistance values, the negative-sequence rotor resistance values, and the current values, using the equations and methods described above. Thus, the IED is capable of monitoring the motor using an accurate value of slip, calculated using a minimum of the resistance values during an initiation period.

The IED 120 further includes a communication device 916 that is capable of receiving commands from the processor 906 and transmitting them to receiving devices such as circuit breakers 910A, 910B, and 910C. If the protection modules operating on the processor 906 call for the motor to be tripped, the processor 906 can send a signal to the communications device 916 which signals circuit breakers 910A, 910B, and 910C to open, thus tripping off the motor.

Further, the communications device 916 may include a transceiver for communicating with a human-machine interface (HMI) 918 such as a computer, a laptop computer, a computer accessed via a network, or the like. Certain inputs such as motor parameters (e.g. full load current (FLA in amps), locked rotor current (LRA in per unit of FLA), locked rotor time (LRTHOT in seconds), locked rotor torque (LRQ in per unit of rated torque), full load slip (FLS in per unit)) and the like may be entered using the HMI and communicated to the processor 906, which may then store the values using the data storage 908.

As described above, with the necessary information entered, the processor may execute modules and/or computer instructions to accurately calculate slip and perform the necessary motor monitoring and protection functions.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for providing thermal protection and monitoring to a three-phase electric motor during startup of the motor, comprising:
    sampling an electrical signal to the motor;
    calculating positive-sequence voltage values from the sampled electrical signal during a startup period;
    calculating positive-sequence current values from the sampled electrical signal during the startup period;
    calculating resistance values from the calculated positive-sequence voltage values and the calculated positive-sequence current values during the startup period;
    determining an initial resistance value equal to a minimum of the resistance values calculated during a predetermined initiation period;
    calculating slip values from the initial resistance value;
    calculating rotor resistance values from the slip values; and,
    calculating rotor temperature from the rotor resistance values and current values sampled from the power signal to the motor.

2. The method of claim 1, wherein the step of calculating the resistance values comprises calculating motor resistance values.

3. The method of claim 2, wherein the step of determining an initial resistance value comprises determining an initial motor resistance value equal to a minimum of the motor resistance values calculated during the predetermined initiation period.

4. The method of claim 2, further comprising the step of calculating stator resistance values from the motor resistance values.

5. The method of claim 4, wherein the step of determining an initial resistance value comprises determining an initial stator resistance value equal to a minimum of the stator resistance values calculated during the predetermined initiation period.

6. The method of claim 1, wherein the startup period comprises the predetermined initiation period.

7. The method of claim 6, wherein the predetermined initiation period comprises a period including a number of power system cycles.

8. The method of claim 6, wherein the predetermined initiation period comprises a period including the first ten power system cycles during the startup period.

9. The method of claim 6, wherein the predetermined initiation period comprises a period including the first four power system cycles during the startup period.

10. The method of claim 6, wherein the predetermined initiation period begins after the first power system cycle.

11. The method of claim 10, wherein the predetermined initiation period begins after a predetermined condition is satisfied.

12. The method of claim 1, wherein the step of calculating rotor temperature comprises:
    calculating positive-sequence rotor resistance values from the slip values;
    calculating negative-sequence rotor resistance values from the slip values; and,
    calculating rotor temperature values from the calculated positive-sequence rotor resistance values, the negative-sequence rotor resistance values, and the current values sampled from the power signal to the motor.

13. A system for monitoring a rotor temperature of a rotor of a three-phase electric motor during a startup period, comprising;
    a three-phase electric motor comprising a rotor, a stator, and an electric power input for providing electric power to the electric motor;
    a current transformer in communication with the electric power input for providing a current signal;
    a potential transformer in communication with the electric power input for providing a voltage signal;
    a first sampler in communication with the current transformer for sampling the current signal to provide current samples;
    a second sampler in communication with the potential transformer for sampling the voltage signal and to provide voltage samples;
    a positive-sequence current calculator in communication with the first sampler for calculating positive-sequence current values from the current samples;
    a positive-sequence voltage calculator in communication with the second sampler for calculating positive-sequence voltage values from the voltage samples;
    a resistance calculator in communication with the positive-sequence current calculator and the positive-sequence voltage calculator for calculating resistance values from the positive-sequence current values and the positive-sequence voltage values;
    an initial resistance calculator in communication with the resistance calculator for determining an initial resistance value equal to a minimum of the resistance values during a predetermined initiation period;
    a slip calculator in communication with the initial resistance calculator and the resistance calculator for determining slip values from the initial resistance value and the resistance values;
    a rotor resistance calculator in communication with the slip calculator for calculating slip-dependent rotor resistance values from the slip values; and
    a rotor temperature calculator in communication with the rotor resistance calculator and the first sampler, for calculating rotor temperature values from the current values and the slip-dependent rotor resistance values.

14. The system of claim 13, wherein the resistance calculator comprises a motor resistance calculator and the resistance values comprises motor resistance values.

15. The system of claim 14, wherein the initial resistance value comprises an initial motor resistance value equal to a minimum of the motor resistance values calculated during the predetermined initiation period.

16. The system of claim 14, further comprising a stator resistance calculator in communication with the motor resistance calculator for calculating stator resistance values from the motor resistance values.

17. The system of claim 16, wherein the initial resistance value comprises an initial stator resistance value equal to a minimum of the stator resistance values calculated during the predetermined initiation period.

18. The system of claim 13, wherein the startup period comprises the predetermined initiation period.

19. The system of claim 18, wherein the predetermined initiation period comprises a period including a number of power system cycles.

20. The system of claim 18, wherein the predetermined initiation period comprises a period including the first ten power system cycles during the startup period.

21. The system of claim 18, wherein the predetermined initiation period comprises a period including the first four power system cycles during the startup period.

22. The system of claim 18, wherein the predetermined initiation period comprises a period beginning after the first power system cycle.

23. The system of claim 22, wherein the predetermined initiation period begins after a predetermined condition is satisfied.

24. The system of claim 13, wherein:
the rotor resistance calculator is further configured to:
calculate positive-sequence rotor resistance values from the slip values; and,
calculate negative-sequence rotor resistance values from the slip values; and,
the rotor temperature calculator is further configured to calculate rotor temperature values from the calculated positive-sequence rotor resistance values, the negative-sequence rotor resistance values, and the current values sampled from the power signal to the motor.

25. An apparatus for monitoring a rotor temperature of a rotor of a three-phase electric motor during a startup period, comprising:
a first sampler in communication with an electric power input to the electric motor for sampling a current signal to provide current samples;
a second sampler in communication with the electric power input for sampling a voltage signal and to provide voltage samples;
a positive-sequence current calculator in communication with the first sampler for calculating positive-sequence current values from the current samples;
a positive-sequence voltage calculator in communication with the second sampler for calculating positive-sequence voltage values from the voltage samples;
a resistance calculator in communication with the positive-sequence current calculator and the positive-sequence voltage calculator for calculating resistance values from the positive-sequence current values and the positive-sequence voltage values;
an initial resistance calculator in communication with the resistance calculator for determining an initial resistance value equal to a minimum of the resistance values during a predetermined initiation period;
a slip calculator in communication with the resistance calculator and the initial resistance calculator for determining slip values from the resistance values and the initial resistance value;
a rotor resistance calculator in communication with the slip calculator for calculating slip-dependent rotor resistance values from the slip values; and
a rotor temperature calculator in communication with the rotor resistance calculator and the first sampler, for calculating rotor temperature values from the current values and the slip-dependent rotor resistance values.

26. The apparatus of claim 25, wherein the resistance calculator comprises a motor resistance calculator and the resistance values comprises motor resistance values.

27. The apparatus of claim 26, wherein the initial resistance value comprises an initial motor resistance value equal to a minimum of the motor resistance values calculated during the predetermined initiation period.

28. The apparatus of claim 26, further comprising a stator resistance calculator in communication with the motor resistance calculator for calculating stator resistance values from the motor resistance values.

29. The apparatus of claim 28, wherein the initial resistance value comprises an initial stator resistance value equal to a minimum of the stator resistance values calculated during the predetermined initiation period.

30. The apparatus of claim 26, wherein the startup period comprises the predetermined initiation period.

31. The apparatus of claim 30, wherein the predetermined initiation period comprises a period including a number of power system cycles.

32. The apparatus of claim 30, wherein the predetermined initiation period comprises a period including the first ten power system cycles during the startup period.

33. The apparatus of claim 30, wherein the predetermined initiation period comprises a period including the first four power system cycles during the startup period.

34. The apparatus of claim 30, wherein the predetermined initiation period comprises a period beginning after the first power system cycle.

35. The apparatus of claim 34, wherein the predetermined initiation period begins after a predetermined condition is satisfied.

36. The apparatus of claim 25, wherein:
the rotor resistance calculator is further configured to:
calculate positive-sequence rotor resistance values from the slip values; and,
calculate negative-sequence rotor resistance values from the slip values; and,
the rotor temperature calculator is further configured to calculate rotor temperature values from the calculated positive-sequence rotor resistance values, the negative-sequence rotor resistance values, and the current values sampled from the power signal to the motor.

* * * * *